(12) United States Patent
Johann et al.

(10) Patent No.: US 6,814,202 B1
(45) Date of Patent: Nov. 9, 2004

(54) HYDRODYNAMIC TORQUE CONVERTER WITH AT LEAST ONE AXIAL BEARING ARRANGEMENT FOR SUPPORTING THE STATOR

(75) Inventors: Herbert Johann, Würzburg (DE); Roman Vesper, Sennfeld (DE); Petra Dahl, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/610,934

(22) Filed: Jul. 1, 2003

(30) Foreign Application Priority Data

Jun. 12, 2003 (EP) ............................................ 03013214

(51) Int. Cl.⁷ .............................................. F16H 41/30
(52) U.S. Cl. ..................... 192/45; 192/3.3; 192/110 B; 192/113.32; 60/345
(58) Field of Search ........................ 192/3.3, 45, 110 B, 192/113.32; 60/345

(56) References Cited

U.S. PATENT DOCUMENTS

| | | | | |
|---|---|---|---|---|
| 3,517,789 A | * | 6/1970 | Gimmler et al. ........... | 192/3.21 |
| 4,441,315 A | | 4/1984 | Bochot | |
| 4,523,916 A | | 6/1985 | Kizler et al. | |
| 5,125,487 A | * | 6/1992 | Hodge ....................... | 192/3.34 |
| 5,575,363 A | | 11/1996 | Dehrmann et al. | |
| 5,676,230 A | | 10/1997 | Awaji et al. | |
| 5,704,456 A | * | 1/1998 | Hinkel ....................... | 192/3.29 |
| 5,769,196 A | * | 6/1998 | Murata ....................... | 192/3.29 |
| 6,394,243 B1 | * | 5/2002 | Sasse ........................ | 192/3.29 |
| 6,471,021 B1 | * | 10/2002 | Sasse et al. ................ | 192/3.29 |
| 6,615,582 B2 | * | 9/2003 | Yamamoto et al. ........... | 60/345 |

FOREIGN PATENT DOCUMENTS

| | | | |
|---|---|---|---|
| DE | 197 52 187 A1 | 6/1999 | |
| JP | 2-6111 A | * 1/1990 | ........... B29C/45/16 |

* cited by examiner

Primary Examiner—Richard M. Lorence
(74) Attorney, Agent, or Firm—Cohen, Pontani, Lieberman & Pavane

(57) ABSTRACT

A hydrodynamic torque converter is provided with a converter housing to hold at least one pump wheel, one turbine wheel, and one stator to form a hydrodynamic circuit and with at least one axial bearing arrangement for supporting the stator. At least one support element has a bearing side which rests against the axial bearing arrangement, and a stator side which rests against a component of the stator and is designed with at least one flow passage for viscous medium, which forms a connection between at least one flow conduit and the hydrodynamic circuit. The flow passage has a flow bed and, contiguous with that, at least one boundary wall, which leads from the flow bed to the axial level of the corresponding support element side. The bearing side of the support element is essentially flat and the stator side is provided with at least one flow passage, in the extension area of which a stiffener is provided, which produces at least a partial connection between the flow bed of the flow passage and the at least one boundary wall.

14 Claims, 2 Drawing Sheets

HYDRODYNAMIC TORQUE CONVERTER WITH AT LEAST ONE AXIAL BEARING ARRANGEMENT FOR SUPPORTING THE STATOR

BACKGROUND OF THE INVENTION

1. Field of the Invention

The invention pertains to a hydrodynamic torque converter of the type having a converter housing containing a pump wheel, a turbine wheel and a stator forming a hydrodynamic circuit; at least one axial bearing supporting the stator; and a support element for each axial bearing, the support element having a bearing side in contact with the axial bearing, and a stator side, facing away from the axial bearing, in contact with the stator. At least one flow passage connects at least one flow conduit to said hydrodynamic circuit, the flow passage being defined by a flow bed facing the stator and at least one boundary wall extending from the flow bed to the stator side of the support element.

2. Description of the Related Art

A torque converter of this type is known from, for example, DE 197 52 187 A1. The torque converter has a converter housing to hold at least one pump wheel, one turbine wheel, and one stator, where the wheels just mentioned serve to create a hydrodynamic circuit. The stator is positioned by an axial bearing arrangement on each side, where a support element assigned to the axial bearing arrangement is provided axially between a component of the stator, especially its freewheel, and said axial bearing arrangement. Each of these support elements has a bearing side, which faces the axial bearing arrangement, and a stator side, which faces the freewheel of the stator. These support elements have flow passages for viscous medium, so that in this way a connection can be established between at least one flow conduit connected to a pressure source and the hydrodynamic circuit. The flow passage has a flow bed and boundary walls adjacent thereto on both sides, which lead from the flow bed to the axial level of the bearing side of the support element.

In these types of torque converters, needle bearings are usually used as the axial bearing arrangements, which for cost reasons are designed as so-called "compact bearings". These are characterized in that they have two relatively thin bearing disks, which can rotate relative to each other, between which the rolling elements are installed.

Because relatively high axial forces are exerted on these axial bearing arrangements, it is possible, especially when the support elements are designed with large-volume flow passages on the bearing side, for the bearing disk adjacent to this flow passage to be plastically deformed by the pressure exerted on it by the rolling elements of the compact bearing and thus pressed into the flow passage, which ultimately leads to damage to the axial bearing arrangement and to a narrowing of the flow passage. To reduce the severity of this problem, it is possible, of course, as done in DE 197 52 187 A1, to design the flow passage with a large component extending in the circumferential direction so that radial contact surfaces for the bearing disk of the compact bearing can be provided at all times on the bearing side of the support element in spite of the flow passages, but this results in an undesirable increase in the distances which the viscous medium must travel within the flow passages. Despite these design measures, plastic deformations of the bearing disk in question can still not be completely excluded.

SUMMARY OF THE INVENTION

The invention is based on the task of improving the support elements assigned to axial bearing arrangements in such a way that these elements prevent damage to the bearing disks especially of a compact bearing and nevertheless allow the viscous medium to flow at a comparatively high rate over a short distance.

According to the invention, the bearing side of each support element is essentially flat, and the stator side is provided with at least one flow passage provided with a stiffener connecting the flow bed and the at least one boundary wall. As a result of the essentially flat design of the bearing side of the support element, i.e., the side of the support element facing the axial bearing arrangement, the conditions are created under which a bearing disk on the axial bearing arrangement, especially an axial bearing arrangement designed as a compact bearing, receives support with no interruptions on the bearing side of the support element, with the result that especially the axial forces exerted by the rolling elements of the axial bearing arrangement can be transmitted over a large area via the bearing disk to the adjacent support element.

To prevent the bearing side of the support element from undergoing plastic deformation upon the introduction of axial forces, the minimum of one flow passage, which, according to the invention, is provided on the stator side of the support element, i.e., on the side of the support element which faces away from the axial bearing arrangement, with a stiffener in the area over which it extends. By establishing at least a partial connection between the flow bed of the flow passage and the minimum of one boundary wall, this stiffener makes the flow passage more resistant to deformation, but it also has the ability to absorb the axial forces being exerted on the flow bed of the flow passage, which have been absorbed on the bearing side of the support element, and to transmit them onward via the minimum of one boundary wall to the stator side of the support element, so that these axial forces can then be introduced directly into the component (such as the outer freewheel ring) of the stator adjacent to the stator side of the support element. The stiffener is preferably provided on the flow bed at a point where the bed is more susceptible to deformation and where as a result the strength provided by the stiffener is especially effective.

Because the stiffener is located within the flow passage and projects from the flow bed toward the stator side of the support element, the stiffener does not take up any room. In addition, the stiffener can function as a flow guide within the flow passage. A stiffener, especially the stiffener on the engine-side support element, can be given the function of a throttle element, which constricts the flow passage. This is explained below:

Normally, the flow passage in the support element on the transmission side is used to supply the hydrodynamic circuit with fresh viscous medium, whereas the flow passage in the engine-side support element is used to allow the return of the viscous medium. It is therefore easy to regulate the flow rate in the hydrodynamic circuit via the engine-side flow passage. For this purpose, the engine-side flow passage can have a smaller volume flow rate than the transmission-side flow passage. This volume flow rate can be made even smaller by the stiffener, which projects into the flow passage and thus constricts the flow passage.

Simultaneously, the stiffener can also be used to reduce, if not to eliminate, any residual leakage which may occur from the transmission-side flow passage into the engine-side flow passage; this residual leakage tends to occur primarily in the area where the rolling elements of the freewheel have their radial dimension. The stiffener can reduce the severity of the residual leakage problem by diverting the medium arriving from the transmission-side flow passage back toward the side of its origin, or the stiffener can close off the engine-side flow passage completely or at least almost completely to the viscous medium arriving via the residual leakage connection.

According to advantageous elaborations, the flow passages extend essentially in the radial direction, so that the viscous medium travels only a short distance within the flow passages. Because of the flat surface of the bearing side of the support element and because of the presence of the stiffeners in the flow passages, the flow passages can designed with very wide dimensions in the circumferential direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
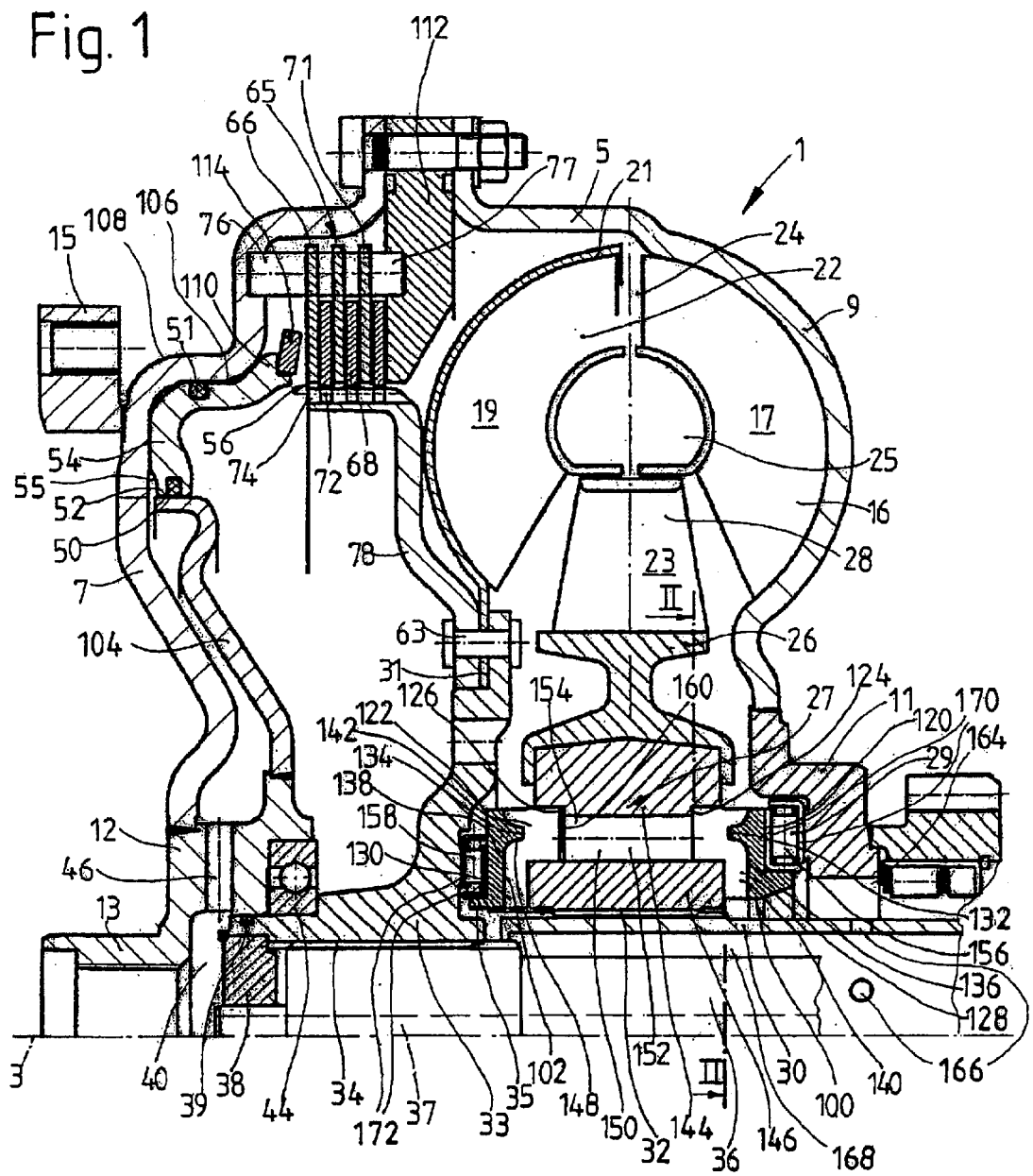
FIG. 1 shows the upper half of a longitudinal cross section through a torque converter with axial bearing arrangements and support elements assigned to the axial bearing arrangements, each support element being provided with at least one flow passage.
Figure 2:
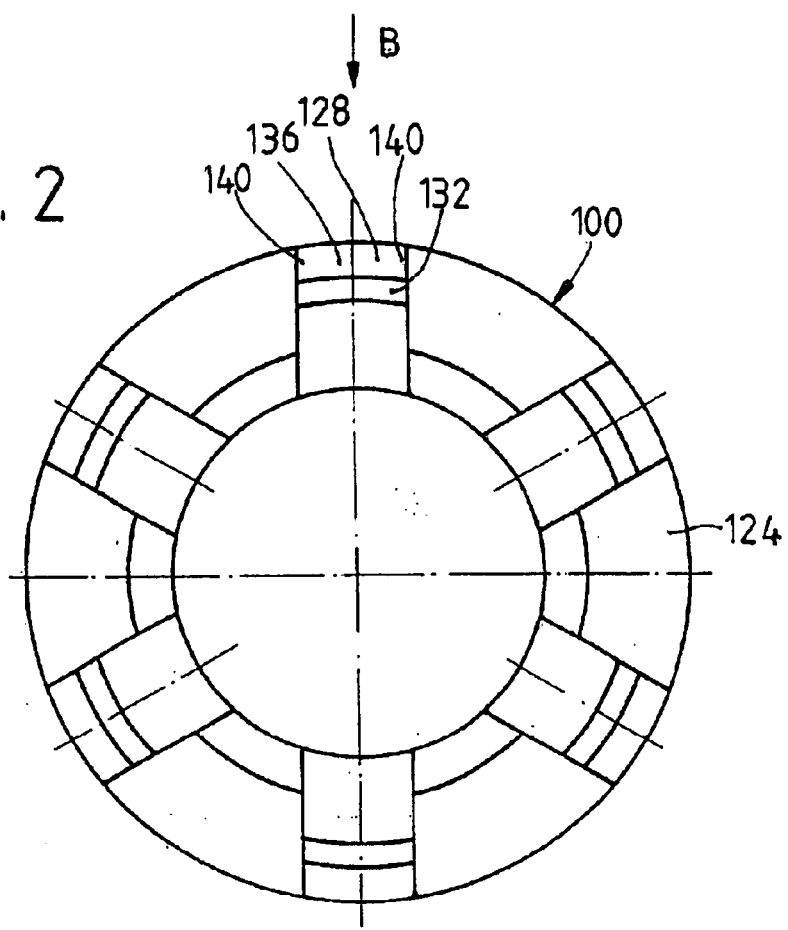
FIG. 2 shows a detail of the transmission-side support element of FIG. 1 in cross section along line II-II in FIG. 1.
Figure 3:
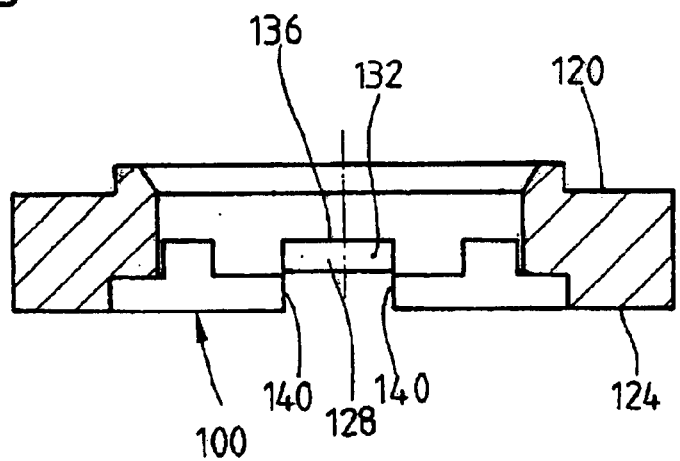
FIG. 3 shows the support element from the perspective indicated by the arrow B in FIG. 2.

FIG. 1 shows a hydrodynamic torque converter 1, which is able to rotate around an axis of rotation 3. The hydrodynamic torque converter 1 has a converter housing 5, which has a converter cover 7 on the side facing the drive (not shown), such as an internal combustion engine. The cover is permanently connected to a pump wheel shell 9. This shell is connected in its radially inner area to a pump wheel hub 11.

In its radially inner area, the converter cover 7 has a journal hub 12, which carries a bearing journal 13. The journal bearing 13 is mounted on an element of the drive, such as a crankshaft, in a manner known in and of itself (and therefore not shown) in order to center the converter housing 5 on the drive side. In addition, the converter cover 7 also has a mounting 15, which usually serves to attach the converter housing 5 to the drive, preferably by way of a flex plate (not shown). For a drawing of how the bearing journal of a torque converter can be mounted on a crankshaft of a drive and how the torque converter can be connected by way of a flex plate to the crankshaft, see, for example, FIG. 1 in U.S. Pat. No. 4,523,916.

The previously mentioned pump wheel shell 9, together with the pump wheel vanes 16, forms a pump wheel 17, which works together both with a turbine wheel 19, which has a turbine wheel shell 21 and turbine wheel vanes 22, and with a stator 23. The pump wheel 17, the turbine wheel 19, and the stator 23 form a hydrodynamic circuit 24 in the known manner, which encloses an internal torus 25.

It should also be mentioned that the stator vanes 28 of the stator 23 are provided on a stator hub 26, which is mounted on a freewheel 27. The latter is supported axially against the pump wheel hub 11 by a transmission-side support element 100, which is assigned to an adjacent axial bearing arrangement 29, and is connected nonrotatably but with freedom to slide axially by way of a set of engaging teeth 32 to a support shaft 30, which is radially inside the pump wheel hub 11, and, like this hub, forms a radial boundary of an essentially ring-shaped first flow conduit 164. The support shaft 30, which is designed as a hollow shaft, for its own part surrounds a transmission shaft 36, which, together with the support shaft 30, forms the radial boundary of an also essentially ring-shaped second flow conduit 168. The transmission input shaft 36 is provided with a central bore 37 for the passage of hydraulic fluid and has a set of teeth 34 by which it holds a turbine hub 33 nonrotatably but with freedom of axial movement. The radially outer area of this turbine hub 33 is connected to a turbine wheel base 31 by means of a riveted joint 63. On one side, the turbine hub 33 is supported on the previously mentioned freewheel 27 by an axial bearing arrangement 35 and by an engine-side support element 102 assigned to the axial bearing arrangement; on the other side, it is supported by an axial bearing arrangement 44 on the journal hub 12. Radially on the inside, the turbine hub 33 is sealed off against the transmission input shaft 36 by a seal 38, and radially toward the outside it is sealed off against the journal hub 12 by a seal 39.

The previously mentioned central bore 37 in the transmission input shaft 36 serves to provide pressure to a chamber 55 required for the actuation of a bridging clutch 56; this chamber 55 is located axially between the converter cover 7 and a piston 54 of the bridging clutch 56. For this purpose, hydraulic fluid which has entered via the central bore 37 of the transmission input shaft 36 arrives in a transition space 40, and from there it passes by way of channels 46 in the journal hub 12 serving as a flow passage radially outward into the chamber 55. The piston 54 of the bridging clutch 56 is mounted centrally with respect to the converter cover 7; the side of the piston which faces away from the chamber 55 faces the hydrodynamic circuit 24 and, as a function of the pressure relationships in the hydrodynamic circuit 24 and in the chamber 55, can be moved in the axial direction between the two different limit positions. To allow this movement, the piston 54 is centered by means of a piston base 52 on a piston carrier 104, which is attached to the journal hub 12, and also by means of a slide guide 106 of a backward axial projection 108 of the converter cover 7. Piston seals 50, 51, which serve to provide a seal between the hydrodynamic circuit 24 and the chamber 55, are recessed into both the slide guide 106 and the piston base 52.

Axially between a plunger 110 of the piston 54 and a pressure plate 112, which is installed axially between the converter cover 7 and the pump wheel shell 9, a disk package 65 is provided, which has outer disks 66 and inner disks 68. The outer disks 66 are provided at their outer circumferences with sets of teeth 71, proceeding in the circumferential direction, which are connected in nonrotatable but axially movable fashion to pin-like anti-rotation locks 76. These pins are attached to the converter cover 7 and serve as carriers 77 for the outer disks. The inner disks 68 are provided on their inner circumferences with sets of teeth 72, proceeding in the circumferential direction, which are connected in nonrotatable but axially movable fashion to the sets of teeth 74 on an inner disk carrier 78, attached to the turbine wheel base 31 and thus to the turbine hub 33.

When the bridging clutch 55 is disengaged, the piston 54 is in the first limit position shown in FIG. 1, in which the disks 66, 68 are relieved of axial load. To engage the bridging clutch 55, the piston 54 is moved into a second limit position in the direction toward the pressure plate 112, so that the disks 66, 68 are put under load in the axial direction and can transmit torque via an axial spring 114 installed axially between the plunger 110 of the piston 54 and the disk 66 closest to the piston 54. The axial spring 114 makes it possible for the bridging clutch 56 to engage more smoothly and for the piston 54 to return to its first limit position as soon as the pressure in the chamber 55 has fallen again in comparison with the pressure in the hydrodynamic circuit 24.

We return now to the transmission-side support element 100 between the axial bearing arrangement 29 on the pump wheel hub 11 and the stator 23. This support element 100 has a bearing side 120 facing the axial bearing arrangement 29; the stator side 124 of the support element, i.e., the side which faces the stator 23, engages axially in the freewheel 27 of the stator 23. That is, while supporting itself axially on the outer ring 144 of the freewheel 27, this side of the support element fits essentially into the area extending radially between the ring 144 and the radially inner ring 146, this area of the freewheel 27 also being provided with rolling elements 150. As a result, the stator 23 is centered with respect to the transmission-side support element 100 and held axially in position via the freewheel 27. The transmission-side support element 100 is for its own part centered with respect to the axial bearing arrangement 29 and is in axial contact with it, the axial bearing arrangement 29 being centered and secured axially in position on the pump wheel hub 11. On the engine side, the stator 23 is also centered and axially secured, namely, by the engine-side support element 102, the bearing side 122 of which, i.e., the side facing the axial bearing arrangement 35, is supported on the turbine hub 33, whereas the stator side 126 of the support element, i.e., the side facing the stator 23, is supported on the radially outer ring 144 of the freewheel 23. The stator side 126 of the engine-side support element 102, like the stator side 124 of the transmission-side support element 100, extends essentially into the radial area of the freewheel 27 in which its rolling elements 150 are contained.

Beyond this centering and axial securing function of the support elements 100, 102, these elements are also provided with flow passages 128, 130. The first flow conduit 164, which extends radially between the pump wheel hub 11 and the support shaft 30, is connected to the hydrodynamic circuit 24 by the flow passages 128 of the transmission-side support element 100. The first flow conduit 164 is connected by radial passages 166 in the support shaft 30 to the second flow conduit 168 radially between the support shaft 30 and the transmission input shaft 36. The second flow conduit 168 is connected essentially to the flow passages 130 of the engine-side support element 102.

In the present embodiment of the torque converter 1, the hydrodynamic circuit 24 is to be supplied essentially via the flow passages 128 of the transmission-side support element 100. In contrast, the flow passages 130 in the engine-side support element 102 are intended to make it possible to control the flow in the hydrodynamic circuit 24. This functional division between the two support elements 100, 102 means that the size of the open cross sections of the flow passages 128 in the transmission-side support element 100 are larger than the open cross sections of the flow passages 130 in the engine-side support element 102. In the case of the transmission-side support element 100, for example, the flow passages 128 can be provided with a large open flow cross section by extending the boundary walls 140 on each side of the flow bed 136 from the flow bed 136 of each flow passage 128 sufficiently far in the direction toward the neighboring freewheel 27 and thus up as far as the stator side 124 of the support element. The flow passages 130 of the engine-side support element 102 also have a flow bed 138, from which boundary walls 142 extend toward the adjacent stator 27 and thus extend up as far as the stator side 126 of the support element, but the degree to which the boundary walls 142 extend between the flow bed 138 and the stator side 126 of the support element is smaller than that by which the boundary walls 140 extend between the flow bed 136 and the stator side 124 of the support element 100. Necessarily, therefore, the flow passages 128 are deeper in the axial direction on the transmission-side support element 100 than the flow passages 130 on the engine-side support element 102. Obviously, the flow passages 128, 130 on the support elements 100, 102 do not necessarily have to be of different depths; instead, in order to produce the different throughputs, they can also differ from each other with respect to their dimensions in the circumferential direction, where in this case the flow bed 136 of the flow passages 128 of the transmission-side support element 100 will be wider in the circumferential direction than the flow bed 138 of the flow passage 130 of the engine-side support element 102. A combination of different widths of the flow beds 136, 138 and different heights of the boundary walls 140, 142 is also conceivable as a way of achieving flow passages 128, 130 with different open flow cross sections.

The greatest axial extension of the boundary walls 140, 142 of the support elements 100, 102 is essentially in the area of the radial dimension of the rolling elements 150 of the freewheel 27. It is preferably in this radial area where the axial bearing arrangements 29, 35 are also in contact with the associated support element bearing sides 120, 122 that the support elements 100, 102 are each provided with stiffeners 132, 134, one of which is located inside each of the flow passages 128, 130. Each of the stiffeners is connected to the flow bed 136, 138 and to the boundary walls 140, 142. The stiffeners 132, 134 are elevated with respect to the associated flow bed 136, 138 and thus project toward the adjacent stator 23. They increase the stability of the support element with respect to the axial forces exerted by the associated axial bearing arrangement 29, 35 resting against the bearing side 120, 122 of the support element, this increased stability being attributable to the extra amount of material present in the radial area of the stator side 120, 122 of the support element. At the same time, the stiffeners 132, 134 also preferably connect the two boundary walls 140, 142 to each other in the area where the flow passages 128, 130 extend, so that axial forces introduced via the bearing side 120, 122 of the support element can be transmitted via the stiffeners 132, 134 to the adjacent stator sides 124, 126 of the support element. As a result, axial forces absorbed by the axial bearing arrangements 29, 35 can be sent along to the radially outer ring 144 of the freewheel 27. Through the use of the stiffeners 132, 132, it therefore becomes possible to design the flow passages 128, 130 of the support elements 100, 102 on the side facing the stator 23 in such a way that the axial bearing arrangements 29, 35 can be provided preferably in each case in the form of "compact bearings", which are characterized in that preferably needle-shaped rolling elements 156, 158 work together with bearing disks 170, 172 with a very small cross sections. The axial forces which are transmitted by the rolling elements 156, 158 to the support elements 100, 102 can therefore be transmitted to the support elements 100, 102 in the form of comparatively high linear loads.

Viscous medium flowing in from the first flow conduit 164 flows radially outward via the flow passages 128 of the transmission-side support element 100, where it can be diverted slightly by the stiffeners 132 in the direction toward the engine-side support element 102, but measures are taken on the freewheel 27 to allow most of the viscous medium to bypass the stiffeners 132 of the transmission-side support element 100 thus to travel radially farther outward until it reaches the hydrodynamic circuit 24.

One of these measures on the freewheel 27 can be, for example, a comparatively narrow flow cross section of the engine-side support element 102, so that, simply as a result of this measure, the flow passages 130 of the engine-side support element 102 can serve a throttling function, which at least considerably impedes the replenishing flow of viscous medium through a flow route 152, this flow route 152 being situated in the area where the rolling elements 150 of the freewheel 27 have their radial dimension and thus proceeding in the form of subroutes arranged in the circumferential direction, one between every two rolling elements 150. To this extent, this flow route 152 represents a residual leak connection 154, which effectively prevents the viscous medium entering via the flow passages 128 of the transmission-side support element 100 from leaving the area immediately again on a direct route via the flow route 152 along the flow passages 130 of the engine-side support element 102 without first having been available to the hydrodynamic circuit 24.

On the engine-side support element 102, the stiffeners 134 can assist this throttle function, for which reason they act as effective throttling elements 148, but they can also divert viscous medium coming from the hydrodynamic circuit 24 toward the transmission-side support element 100 and thus fill the residual leak connection 154 with fluid, as a result of which the resupply of viscous medium from the transmission-side support element 100 can be considerably reduced. In the area where the residual leak connection 154 extends, furthermore, it is possible to provide a flow diversion 160, which at least partially closes off the residual leakage connection 154. The flow diversion 160 can be realized in the form of a sealing plate (FIG. 1) inserted in the freewheel 27, which is installed essentially radially between the two rings 144, 146 and occupies essentially the area where the rolling elements 150 extend and thus separates the residual leak connection 154 partially or completely from the flow passage 130 of the engine-side support element 102.

Viscous medium which is supposed to flow away from the hydrodynamic circuit 24 flows through the flow passage 130 of the engine-side support element 102 and into the second flow conduit 168, which, like the first flow conduit 164 and the central bore 37 of the transmission input shaft 36, is connected to a pressure source (not shown) designed in the conventional way. A pressure source of this type is illustrated by way of example in a drawing in FIG. 1 of U.S. Pat. No. 5,575,363.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic torque converter comprising:

a converter housing containing a pump wheel, a turbine wheel and a stator forming a hydrodynamic circuit;

at least one axial bearing supporting the stator; and a support element for each said axial bearing, said support element having an essentially flat bearing side in contact with the axial bearing, a stator side, facing away from the axial bearing, in contact with the stator, and at least one flow passage for viscous medium connecting at least one flow conduit to said hydrodynamic circuit, said flow passage being defined by a flow bed facing the stator, at least one boundary wall extending from the flow bed to the stator side of the support element, and at least one stiffener connecting the flow bed and the at least one boundary wall.

2. A hydrodynamic torque converter as in claim 1 wherein said flow passage has an elevation extending from said flow bed to said stator side.

3. A hydrodynamic torque converter as in claim 2 wherein said stator comprises a freewheel comprising a pair of concentric rings, said support element axially positioning at least one of said rings, said at least one stiffener projecting from said flow bed toward said stator.

4. A hydrodynamic torque converter as in claim 2 wherein said stiffener extends in a circumferential direction.

5. A hydrodynamic torque converter as in claim 2 wherein said converter housing comprises a pump wheel hub and said axial bearing is a transmission-side bearing supported by said pump wheel hub.

6. A hydrodynamic torque converter as in claim 1 wherein said turbine wheel comprises a turbine wheel hub and said axial bearing is an engine-side bearing supported by said turbine wheel hub.

7. A hydrodynamic torque converter as in claim 1 wherein said at least one support element comprises an engine-side support element and a transmission-side support element, the flow passage of one of said support elements being sized to supply essentially all of the viscous medium flowing in the hydrodynamic circuit, the flow passage of the other of said support elements being sized to control the flow in the hydrodynamic circuit.

8. A hydrodynamic torque converter as in claim 7 wherein said flow passage of said transmission-side support element is larger than the flow passage of the engine-side support element.

9. A hydrodynamic torque converter as in claim 7 wherein the stiffener of the engine-side support element acts as throttle to constrict the flow passage of the engine-side support element.

10. A hydrodynamic torque converter as in claim 7 wherein said stator comprises a freewheel comprising a pair of concentric rings and a plurality of rolling elements installed radially between said rings, said rolling elements forming circumferentially therebetween a flow route connecting said flow passage of said transmission-side support element and said flow passage of said engine-side support element, said flow route constituting part of a residual leak connection.

11. A hydrodynamic torque converter as in claim 1 wherein each said flow passage extends essentially radially.

12. A hydrodynamic torque converter as in claim 1 wherein each said axial bearing comprises rolling elements having a diameter, each said flow passage having a circumferential dimension which corresponds to the diameter of a rolling element.

13. A hydrodynamic torque converter as in claim 1 wherein each said flow passage has a stiffener which is substantially radially aligned with an area of the respective bearing side which is in contact with the axial bearing.

14. A hydrodynamic torque converter as in claim 7 wherein said residual leak connection comprises a flow diversion in contact with the engine-side support element, said flow diversion returning viscous fluid from the transmission-side support element to the flow passage of the transmission-side support element.

* * * * *